(12) United States Patent
Vignocchi et al.

(10) Patent No.: US 6,305,704 B1
(45) Date of Patent: Oct. 23, 2001

(54) TELESCOPIC FORK FOR BICYCLES, WITH ANTI-TWISTING CROSS-MEMBER PROVIDED WITH END BUSHINGS ENGAGED WITH AND MECHANICALLY FASTENED ONTO THE UPPER ENDS OF THE OUTER SLIDING TUBES OF THE LEGS OF THE FORK

(75) Inventors: Loris Vignocchi, Zola Predosa; Sandro Musiani, Marzabotto, both of (IT)

(73) Assignee: Marzocchi S.p.A., Bologna (IT)

( * ) Notice: Subject to any disclaimer, the term of this patent is extended or adjusted under 35 U.S.C. 154(b) by 0 days.

(21) Appl. No.: 09/374,474

(22) Filed: Aug. 13, 1999

(30) Foreign Application Priority Data

May 18, 1999 (IT) .......................................... BO 99 A 0263

(51) Int. Cl.[7] .................................................. B62K 21/06
(52) U.S. Cl. ........................................... 280/279; 280/276
(58) Field of Search ................................ 280/281.1, 274, 280/275, 276, 277, 279, 280

(56) References Cited

U.S. PATENT DOCUMENTS 4,775,163 * 10/1988 McGowan et al. .................. 280/277
5,078,417 * 1/1992 Mouritsen ............................ 280/280
5,478,099 * 12/1995 Kawahara ............................ 280/276
5,634,652 * 6/1997 Tsai ..................................... 280/276

FOREIGN PATENT DOCUMENTS 7-117773 * 5/1995 (JP) .

* cited by examiner

Primary Examiner—Brian L. Johnson
Assistant Examiner—Avraham H. Lerner
(74) Attorney, Agent, or Firm—Ward & Olivo

(57) ABSTRACT

The end bushings (102, 102') of the anti-twisting cross member (2) and the upper ends (201, 201') of the outer sliding tubes (1, 1') which are adapted to be coupled into the bushings, are provided laterally respective appendices (10, 10' 22, 22') with respective bores (11, 11', 23, 23'). These parts are superposed and are safely secured together with screws (25, 25') which fasten the outer sliding tubes to the cross member, thus arranging the outer sliding tubes at a predetermined axial distance. The parallelism between the outer sliding tubes is ensured by the abutment of the lower edge (15, 15') of the bushings of the cross member against a corresponding lower step (9, 9') of the upper machined portions of the outer sliding tubes, inserted into the bushings. The possible small clearances due to machining between the coupled parts of the outer sliding tubes and the cross member, are annulled by utilizing a resin inserted between the parts, which initially is liquid and then hardens.

12 Claims, 2 Drawing Sheets

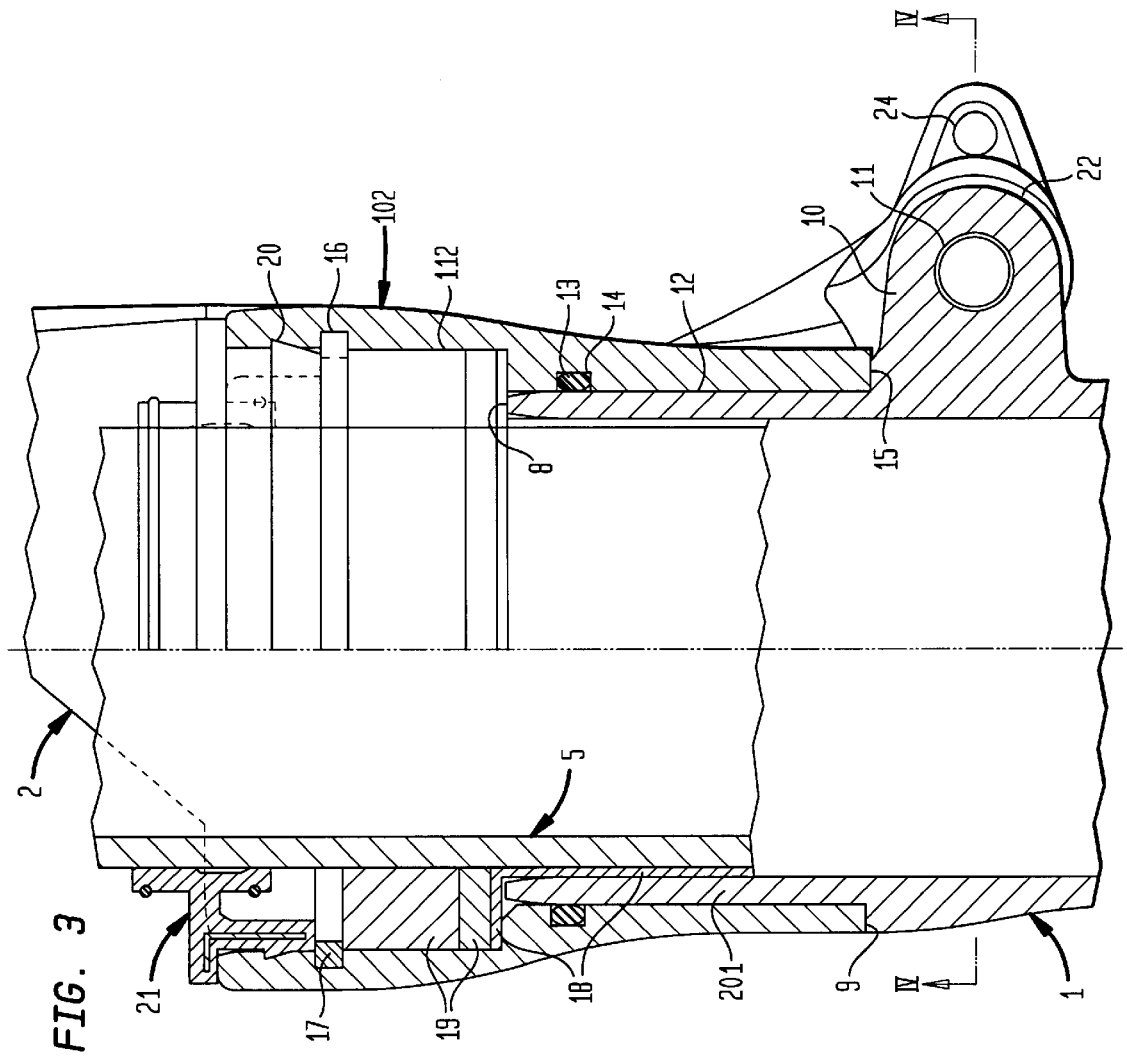
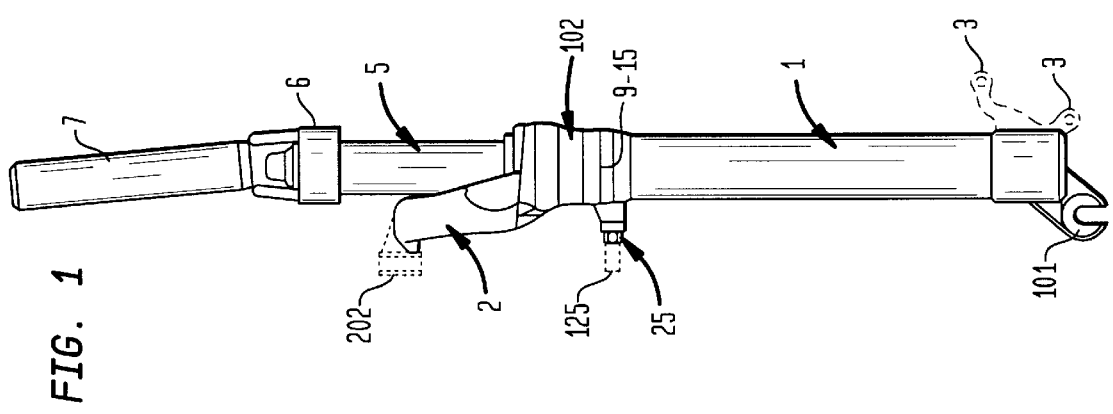

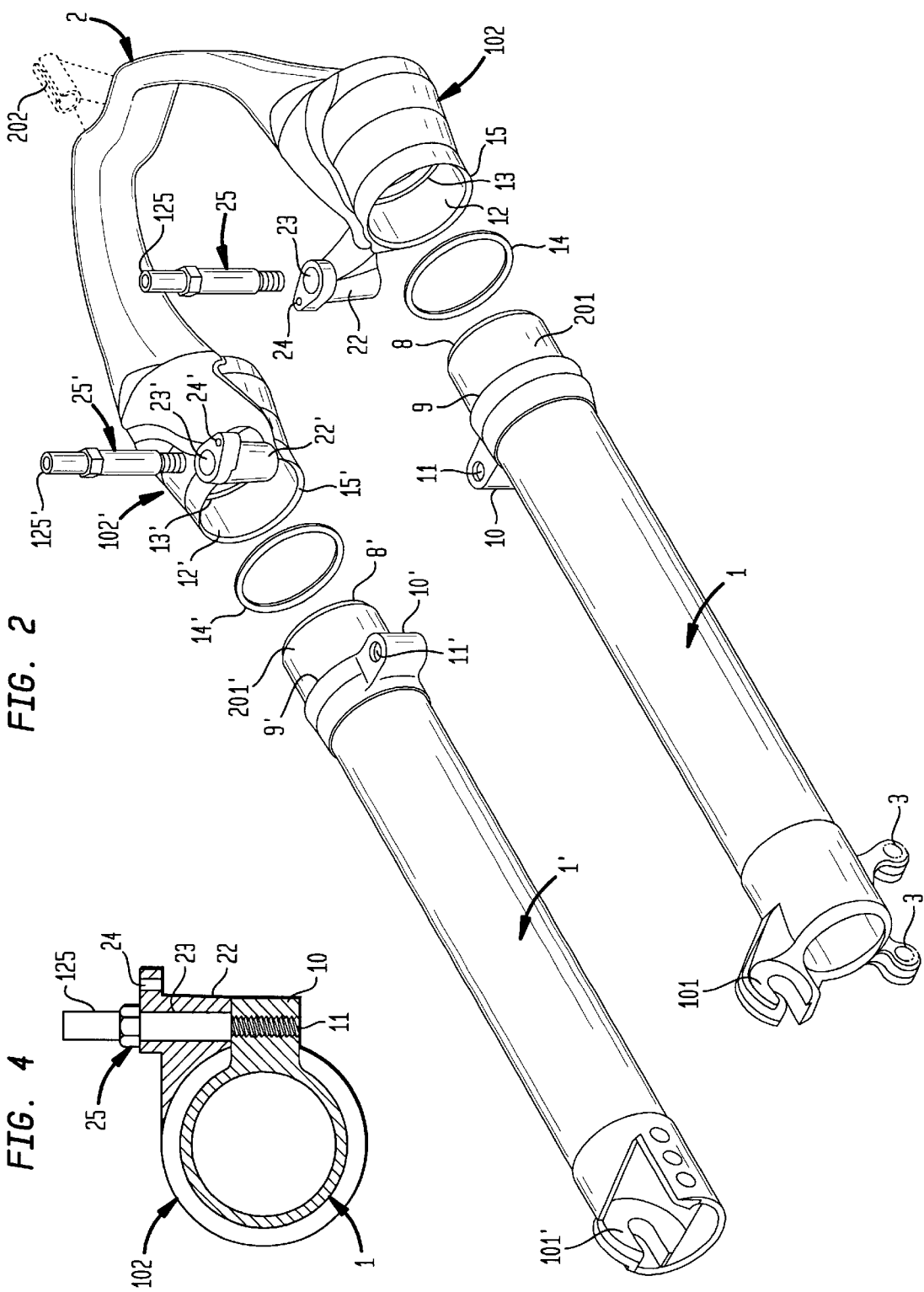

TELESCOPIC FORK FOR BICYCLES, WITH ANTI-TWISTING CROSS-MEMBER PROVIDED WITH END BUSHINGS ENGAGED WITH AND MECHANICALLY FASTENED ONTO THE UPPER ENDS OF THE OUTER SLIDING TUBES OF THE LEGS OF THE FORK

BACKGROUND OF THE INVENTION

The invention relates to the front telescopic forks for bicycles, particularly to the forks provided with parallel outer sliding tubes attached at their bottom to the axle of the wheel and inside which there are telescopically movable inner sliding tubes which are interconnected at the top by the so-called crown which carries on its top and median portion the steering tube. Elastic means and shock absorbers are arranged inside the unit formed by the outer and inner sliding tubes, in order to compensate the stresses to which the fork is subjected. In these forks, the upper ends of the outer sliding tubes are usually interconnected by a cross member having the shape of an inverted "U", which has the function of maintaining parallel the outer sliding tubes, of avoiding torsion (twisting) movements to the fork and which, when the bicycle is provided with a brake acting onto the wheel rim, provides also to support the extremity of the sheath for the wire acting on the brake.

In order to secure the cross member to the outer sliding tubes, presently there are various solutions. One solution consists for example in the pressure coupling of the upper ends of the outer sliding tubes inside the end bushings of the cross member. This solution presents the disadvantage that in order to ensure a perfect parallelism between the outer sliding tubes, it requires very expensive machining operations at the machine tools, inasmuch as the pieces to be coupled together must present extremely precise dimensions.

Another known solution consists in securing the cross member to the outer sliding tubes by means of welding. This solution, if on one hand requires a working of limited precision and not expensive, on the other hand can cause deformation to the outer sliding tubes which could in the long run prejudice their operation.

It is known also the solution proposed in the U.S. Pat. No. 5,635,007 which provides for the realization of the end bushings of the cross member and of the upper ends of the fork by means of mechanical working of scarce precision and which contemplates to secure the two parts reciprocally by means of a structural adhesive for example by means of an epoxy adhesive. This solution, if on one hand simplifies the phase of working of the pieces to be secured, on the other hand leads to complications in the assembly phase of the pieces themselves, which must be arranged onto a reference template in-order to provide that the bushings of the cross member be perfectly aligned with the outer sliding tubes and the presence of the template is required until the adhesive is hardened. It is evident that these phases of mounting and dismounting of the template necessarily complicate the production cycle of the fork and increase its final cost.

SUMMARY OF THE INVENTION

The invention proposes a bicycle fork of simplified construction and of high technological reliability, which contemplates the realization of the cross member with end bushings and the realization of the outer sliding tubes by means of working (machining) of medium precision, and therefore of limited cost and which provides, integral with the bushings of the cross member and with the upper ends of the outer sliding tubes, appendices which when the two above mentioned parts are coupled together, are reciprocally superposed and are arranged so that they can be safely fastened to each other by means of screws. If the fork is intended for a bicycle provided with a brake acting on the rim of the front wheel, the said screws for fastening the cross member to the outer sliding tubes are directed in such a manner and are provided with a projection which can be used as fulcrum for the levers carrying the brake shoes. In order to annul the possible small machining clearance between the inner diameter of the end bushings of the cross member and the outer diameter of the upper ends of the outer sliding tubes, between the two parts there is inserted a small coating of any material which is initially liquid and that subsequently hardens, for example any varnish or resin suitable for this purpose, which can even not present adhesive functions for the reciprocal fastening of the two pieces, inasmuch as the structural fastening is ensured by said appendices and pertaining fastening screws. The bushings of the cross member are arranged with their lower end abutting against a step of the upper end of the outer sliding tubes, thus ensuring the parallelism between the axes of the two parts, while the reciprocal fastening of the said appendices by means of the screws provides for the reciprocal alignment of the axes of the two parts and provides that the axes of the two outer sliding tubes be arranged at a predetermined reciprocal distance, maintaining the whole in the correct position, without the need of alignment templates as required by the known prior art. This precision will be also maintained during the use of the fork, thanks to the hardened resin which annuls the small clearances due to the machining tolerances between the coupled parts of the outer sliding tubes and of the cross member.

BRIEF DESCRIPTION OF THE DRAWINGS

Other features of the invention, and the advantages deriving therefrom, will appear evident from the following description of a preferred embodiment illustrated, by way of non-limiting example, in the figures of the two attached sheets of drawings, in which:

FIG. 1 shows diagrammatically and in front elevation a complete fork of the type disclosed;

FIG. 2 shows in perspective view and exploded into the various components the portion of the fork which forms object of the invention and which comprises the outer sliding tubes and the cross member with the end bushings to be coupled to the upper ends of the said outer sliding tubes;

FIG. 3 shows in longitudinal sections one of the upper ends of an outer sliding tube coupled with a corresponding end bushing of the cross member, the two parts being reciprocally superposed by the relating lateral appendices for the mechanical fastening;

FIG. 4 shows further details of the group of FIG. 3, sectioned transversely along line IV-IV.

DETAILED DESCRIPTION OF A PREFERRED EMBODIMENT

From FIGS. 1 and 2 it appears that the front fork for bicycles according to the invention comprises a pair of parallel outer sliding tubes 1–1' provided at their lower ends with attachments 101–101' for connection to the wheel axle, not shown, and interconnected at their upper ends by an anti-twisting cross member 2. If the fork must be equipped with a disc brake, the lower end of one of the outer sliding tubes carries appendices 3 provided with bores for securing the brake caliper which acts on a disc keyed to the axles of the wheel associated to the said fork. If instead the fork must be equipped with a brake acting on the rim of the front wheel, the cross member 2 can be provided at its middle with a hollow and substantially vertical appendix 202 which is laterally open with a longitudinal cut and onto the upper end of which there abuts the sheath of the steel wire acting on the levers of the front brake, articulated on pins 125–125' orthogonal to the wheel axle and integral with the connecting zones of the parts 1 and 2, as better described hereafter. It is to be noted that in the brakes of the new generation the wire abuts against a stiff small tube which constitutes part of the braking equipment, so that the said appendix 202 is no more required as in the brakes of the old generation. Inside the outer sliding tubes 1 there slide telescopically respective inner sliding tubes 5 (only one is visible in FIG. 1) which normally are urged into a position of maximum extension under the action of elastic means housed together with shock absorbing means at the interior of the telescopic portions of the fork. The upper ends of the inner sliding tubes are secured to a crown 6 which carries at its center portion the steering tube 7.

From FIGS. 2 and 3 it appears that according to the invention the upper end of the inner sliding tubes 1–1' is in origin thickened towards the exterior and is machined with cylindrical shape and with the required precision for an outer portion 201–201' of a predetermined height, so that the said portion presents an end edge 8–8' with a suitable outer conicity and reduction of thickness and presents at its bottom an abutment step 9–9' perpendicular to the axis of the sliding tubes. Below the machined portions 201–201' the outer sliding tubes are provided on the sides directed towards the interior of the fork, with integral identical appendices 10–10' provided with respective bores 11–11' which are threaded and orthogonal to the axis of the sliding tubes.

The cross member 2 is provided at its ends with integral bushings 102–102' having their axes parallel and spaced of a predetermined amount. The said bushings are subjected to an inner cylindrical machining operation, so that each one of them presents two inner chambers having a different diameter, of which the lower chamber 12–12' presenting the smaller diameter presents a width which is equal to the outer width of the machined upper portion 201–201' of the outer sliding tubes, so that is can be coupled with same with a sufficient good precision and is substantially of the same height. The chambers 12–12' are provided at a short distance form their upper edge of at least an annular recess 13–13' inside which there is housed a sealing gasket 14–14'. The lower edge 15–15' of the bushings 102–120' is machined so as to result located on an ideal plane perpendicular to the axis of the said bushings. In the illustrated embodiment the upper chambers 112–112' having a greater diameter of the bushings 102–102' are provided with an intermediate annular recess 16 for housing an elastic ring 17 which keeps in place in its seat the upper bushing 18 presenting a low friction coefficient and which guides the inner sliding tube 5 inside the outer sliding tube and to keep in place the sealing gasket 19 which cooperates with the bushing and with outer side surface of each inner sliding tube 5 of the fork. The upper portion of the chambers 112 112' is provided with an annular recess 20 having a saw tooth profile, for the snap fitting of an annular gasket 21 acting on the inner sliding tube 5 of the fork and having the function of dust scraper.

The cross member 2 is completed by appendices 22–22' presenting for example an L-profile obtained integrally on the side of the bushings 102–102' directed towards the interior of the fork, provided with respective through bores 23–23' orthogonal to the axis of the said bushings and provided on their projecting portion with a small bore 24-24' for anchoring the end of the pin spring which urges into its rest position the brake lever (see after). The appendices 22–22' are intended to be superposed to the above mentioned appendices 10–10' of the outer sliding tubes, so that these appendices will be precision machined on their surfaces intended to the reciprocal superposition. The distance of the axis of the bores 11, 11' and 23, 23' of the said appendices from the respective axis of the outer sliding tubes 1, 1' and of the bushings 102, 102' of the cross member is strictly identical and this condition can be easily achieved by the present numerically controlled machine tools.

Screws 25–25' are finally provided for reciprocally securing the said appendices 10, 10' and 22, 22'.

The constituting parts of the fork are assembled in the following manner. The cross member 2 is preferably clamped on a working bench so as to present the bushings 102–102' directed upwardly. Firstly, the gaskets 14-14' are mounted inside the annular recesses 13–13' of the said bushings 102–102' and subsequently the inner side surface of chambers 102–102' and/or the outer side surface of the machined portions 201–201' of the outer sliding tubes are coated with a small quantity of any product initially in a liquid state and then capable of s solidifying progressively under the action of inner and/or outer agents. As initially mentioned, such a product can be for example a varnish or a resin capable of hardening for example due to polymerization. Subsequently the said machined portion 201–201' of the outer sliding tubes is inserted into the bushings of the cross member. The chamfered ends 8–8' of the outer sliding tubes are easily inserted into the sealing gaskets 14–14' which in this phase have also the function of scrapers in order to avoid that an excess of resin flows into the chambers 112–112' which subsequently will be engaged by the gaskets 19. When this assembly has been completed, the resin will fill any small clearances due to the machining existing between the coupled parts 201, 201', 12, 12'. Subsequently, care will be taken to accurately clean the chambers 112–112' and the parts of the outer sliding tubes next to the steps 9, 9' from any possible leakage of resin. The mounting of the inner sliding tubes can be facilitated by a partial rotation of the said inner sliding tubes. The assemblage will be completed when the steps 9, 9' of the outer sliding tubes abut against the ends 15–15' of the bushings 102–102' and when the appendices 10–10' of the said outer sliding tubes bear against the appendices 22–22' of the cross member 2. The weight of the outer sliding tubes 1–1' maintains the front abutment between the steps 9 –9' and 15–15' and the consequent alignment or parallelism between the axes of the outer sliding tubes and the axes of the bushings 102–102'. Subsequently, the appendices 10, 22 and 10', 22' are reciprocally secured together by means of the pertaining screws 25–25' and in this phase the front abutment between the above mentioned steps 9–15 and 9'–15' is maintained and there is ensured the exact axial alignment between the outer sliding tubes 1–1' and the bushings 102–102' of the cross member, due to the exact alignment of the said appendices. The screws 25–25' block the parts 1–1'–2 in this perfect condition of alignment, permitting to the resin filling the possible small machining clearances between the end of the outer sliding tubes and the bushings of the cross member, to solidify and neutralize said small clearances.

From FIG. 3 it appears evident that the annular gasket 14 has the function of seal in order to avoid, in combination with the gasket 19, any loss of pressure from the inner circuit of compression and dampening of the telescopic assembly of the outer and inner sliding tubes of the fork.

It appears evident the simplicity of assembly of the fork according to the invention which, unlike the known prior art, does not require any operation of association and subsequent removal to and from a template for the alignment.

If the fork is provided with a disc brake (see FIG. 2) the cross member 2 is not provided with the appendix 202, the screws 25–25' are not provided with appendices 125–125' and one of the outer sliding tubes is provided with the bored appendices for supporting the caliper of the disc brake. If instead the fork is intended to carry a brake acting on the wheel rim, the outer sliding tubes are not provided with the said appendices 3, the cross member 2 can be provided with the appendix 202 for supporting the sheath of the braking wire and the screws 25–5' are provided with coaxial appendices 125–125' for creating the fulcrum points for the swinging of the brake levers.

It is to be understood that the description was made with reference to a preferred embodiment of the invention, to which there can be made numerous variations and constructive modifications, which can for example relate to the fact that if the fork is intended to operate with a disc brake, the said appendices 10–10'–22–22' and the corresponding fastening screws 25–25' can be directed in a manner different from the illustrated embodiment, for example so as to realize a real axial clamping between the parts to be secured together. Another modification can consist in the provision of a small annular or helical scoring on the surfaces of the parts 201–201'–12–12' coated by the resin for the filling of the clearances, with the purpose of ensuring a better anchoring of the resin itself onto the contact surfaces. The above and all other modifications which are on the other hand conceivable by a person skilled in the art, do not depart from the limits of the invention as above described, as illustrated and as claimed hereinafter.

What is claimed is:

1. A telescopic fork for bicycles comprising:

outer sliding tubes having top and bottom ends, said bottom ends having appendices for connection to a wheel axle;

inner sliding tubes having top and bottom ends and containing dampening means, said inner sliding tubes being telescopically engaged within said top ends of said outer sliding tubes;

a crown attached to said top ends of said inner sliding tubes, said crown further attached to a steering tube; and a cross member having bushings for attachment to said top ends of said outer sliding tubes, said bushings each having a round section of predetermined diameter having bores therethrough such that said inner sliding tubes are slidably engaged with said bushings;

wherein said top ends of said outer sliding tubes have a cylindrical portion with an outer diameter approximately equal to the inner diameter of said bushings of said cross member, said top ends of said outer sliding tubes having a step perpendicular to the axes of said outer sliding tubes;

wherein the outer surfaces of said outer sliding tubes above said step or the inner surface of said bushings of said cross member contain a small quantity of resin spread such that the lower end of said bushings abut against said step such that said appendices of said outer sliding tubes come to bear against appendices of said bushings; and wherein said appendices of said outer sliding tubes and said appendices of said bushings are secured in axial alignment.

2. A telescopic fork according to claim 1, wherein said appendices of said outer sliding tubes and said appendices of said bushings are arranged on the inner sides of said telescopic fork.

3. A telescopic fork according to claim 1, wherein said appendices of said outer sliding tubes and said appendices of said bushings are positioned on a plane containing the axes of said inner and outer sliding tubes.

4. A telescopic fork according to claim 1, wherein a top end of said cross member contains a hollow appendix to house a brake wire.

5. A telescopic fork according to claim 1, wherein the top of said bushings are higher than said top ends of said outer sliding tubes such that a tight seal may be maintained between said bushings and said inner sliding tubes.

6. A telescopic fork according to claim 1, wherein said top ends of said outer sliding tubes are conical to facilitate insertion of said bushings thereon.

7. A telescopic fork according to claim 1, wherein said cross member is generally shaped as an inverted "U".

8. A telescopic fork according to claim 1, wherein said crown member further comprises an annular recess for housing a sealing gasket positioned near said bottom end of said cross member, said sealing gasket controlling distribution of said resin.

9. A telescopic fork according to claim 1, wherein said resin occupies any existing space located between said outer sliding tubes and said bushings.

10. A telescopic fork according to claim 1, wherein said resin fastens said outer sliding tubes and said bushings.

11. A telescopic fork according to claim 1, wherein screws are used to secure said appendices of said outer sliding tubes and said appendices of said bushings in axial alignment.

12. A telescopic fork according to claim 1, wherein said screws contain projections onto which levers are fulcrumed with brake shoes.

* * * * *